(12) United States Patent
Schladetzky et al.

(10) Patent No.: US 11,451,986 B2
(45) Date of Patent: Sep. 20, 2022

(54) SYSTEM AND METHOD FOR TESTING AND VERIFYING MOBILE DEVICE OPERABILITY IN A REMOTE LOCATION

(71) Applicant: T-MOBILE USA, INC., Bellevue, WA (US)

(72) Inventors: Brian Schladetzky, Bellevue, WA (US); Bharath Reddy Medarametla Lakshmi, Bellevue, WA (US); Lara Marshall, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 39 days.

(21) Appl. No.: 16/890,449

(22) Filed: Jun. 2, 2020

(65) Prior Publication Data
US 2021/0377759 A1 Dec. 2, 2021

(51) Int. Cl.
*H04W 24/06* (2009.01)
*H04B 17/391* (2015.01)

(52) U.S. Cl.
CPC ........ *H04W 24/06* (2013.01); *H04B 17/3912* (2015.01)

(58) Field of Classification Search
CPC .......................... H04W 24/06; H04B 17/3912
See application file for complete search history.

(56) References Cited

U.S. PATENT DOCUMENTS

| | | | | |
|---|---|---|---|---|
| 10,097,981 | B1* | 10/2018 | Talaganov | H04W 4/90 |
| 2008/0293402 | A1* | 11/2008 | Rajan | H04W 16/22 |
| | | | | 455/425 |
| 2011/0257923 | A1* | 10/2011 | Boulton | G01S 5/0221 |
| | | | | 702/117 |
| 2014/0113625 | A1* | 4/2014 | Gruber | H04W 24/00 |
| | | | | 455/435.1 |

* cited by examiner

*Primary Examiner* — Hashim S Bhatti
(74) *Attorney, Agent, or Firm* — Marshall, Gerstein & Borun LLP

(57) ABSTRACT

The current disclosure relates to systems and methods for testing the operability of a mobile device on a remote cellular communication network. The system receives one or more parameters corresponding to a mobile device and a selection of a specific geographic location in a cellular communication network. The system subsequently generates and emulates a clone image including a clone mobile device and clone base station to determine one or more operating values indicative of a performance of the mobile device at the specific geographic location based on the operation of the clone image.

20 Claims, 4 Drawing Sheets

SYSTEM AND METHOD FOR TESTING AND VERIFYING MOBILE DEVICE OPERABILITY IN A REMOTE LOCATION

FIELD OF THE DISCLOSURE

The present disclosure generally relates to systems and methods for testing cellular communication networks and, more particularly, to testing and verifying how a mobile device would interact with a remotely located cellular communication network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cellular communication networks provide users with the ability to wirelessly connect a mobile device to the network in order to make phone calls and/or to access the internet. Typically, the type of access to the network available to the mobile device depends on a number of factors including the type of device, the type of subscription plan corresponding to the device, the location of the device, etc. For example, the speed with which the mobile device receives data from the network may depend on a subscription plan corresponding to the device. Further, the mobile device may have different network access levels depending on the location of the device.

A wireless provider maintains their cellular communication network to ensure that mobile devices on the network have access to the network according to the subscription plan corresponding to each device. Typically, wireless providers implement "probes," which are physical devices that test network operability. The probes can be used to test how different subscription plans work in the local communication network. While these probes are useful for troubleshooting and testing networks, a probe can be expensive to operate and maintain due to physical constraints of the device (i.e. the device must be physically located in the location in which the test is to be performed). Additionally, the use of such probes is insufficient to determine in advance of attempted user connections that user accounts or network components are correctly configured for roaming in various locations and conditions, in order to facilitate correction of configuration parameters before users experience connection problems. A solution is needed to avoid network connection problems by confirming and correcting configuration issues before connection problems arise.

SUMMARY

As described further herein, the disclosure generally relates to systems, methods, and non-transitory computer-readable media storing instructions for verifying mobile device operability in a remote location. An embodiment of the present disclosure includes a system for testing mobile device operability on a remote cellular communication network comprises an input device and an emulation server, where both the input device and emulation server are communicatively coupled to a network, wherein the network is communicatively coupled to a cellular communication network including a cellular communication infrastructure comprising network elements in support of remote services for mobile devices, such as a plurality of base stations, each base station corresponding to a geographic location. The system further comprises one or more non-transitory storage media configured to store processor-executable instructions and one or more processors operatively connected to the emulation server and the one or more non-transitory storage media and configured to execute the processor-executable instructions. The instructions cause the system to receive, via the input device, one or more parameters corresponding to a mobile device and a selection of a specific geographic location. The instructions then cause the system to determine, via one or more processors of the emulation server, a specific station from the plurality of base stations on the cellular communication network, where the specific base station corresponds to the specific geographic location. The instructions cause the system to generate, via one or more processors of the emulation server, a clone image including a clone mobile device and a clone base station, where the clone mobile device is based on the mobile device corresponding to the one or more parameters, and where the clone base station corresponds to the specific base station. The instructions then cause the system to emulate, via the emulation server, the clone image such that the clone mobile device interacts with the clone base station and determine one or more operating values indicative of a performance of the clone image during the emulation of the clone image.

In another embodiment of the present disclosure, a computer-implemented method for testing mobile device operability on a remote cellular communication network comprises receiving, via an input device, one or more parameters corresponding to a mobile device and a selection of a specific geographic location. The method includes determining a specific station from the plurality of base stations on the cellular communication network, where the specific base station corresponds to the specific geographic location. The method also includes generating a clone image including a clone mobile device and a clone base station, where the clone mobile device is based on the mobile device corresponding to the one or more parameters, and where the clone base station corresponds to the specific base station. The method includes emulating the clone image such that the clone mobile device interacts with the clone base station and determining one or more operating values indicative of a performance of the clone image during the emulation of the clone image.

In still another embodiment of the present disclosure, a tangible, non-transitory computer-readable medium stores processor-executable instructions that, when executed by one or more processors of a system, cause the system to receive, via an input device communicatively coupled to a network, one or more parameters corresponding to a mobile device and a selection of a specific geographic location. The instructions then cause the system to determine, via one or more processors of the emulation server, a specific station from the plurality of base stations on the cellular communication network, where the specific base station corresponds to the specific geographic location. The instructions cause the system to generate, via one or more processors of the emulation server, a clone image including a clone mobile device and a clone base station, where the clone mobile device is based on the mobile device corresponding to the one or more parameters, and where the clone base station corresponds to the specific base station. The instructions then cause the system to emulate, via the emulation server, the clone image such that the clone mobile device interacts with the clone base station and determine one or more operating values indicative of a performance of the clone image during the emulation of the clone image.

This summary is not comprehensive and is necessarily limited to certain aspects of the invention described herein. Additional or alternative components, aspects, functions, or actions may be included in various embodiments, as described further below.

DETAILED DESCRIPTION

Mobile service providers face many hurdles when implementing cellular communication networks. For example, subscribers can have data plans customized based on a number of different parameters (data speeds, data limits, call limits, etc.) and those parameters can vary within a data plan based on the subscribers' location. Further, data plans need to work across a broad range of devices including various makes, models, and device types. Due to the large amount of variability between each device, it can be difficult for mobile service providers to test how each device functions in different areas within the entire cellular communication network.

The systems and methods described herein relate to testing the operability of a mobile device on a remote cellular communication network (i.e., mobile data network). In particular, the current application implements tools to clone a mobile device and subsequently emulate the clone to determine how the device would perform in the remote location. The systems and methods described herein are efficient and low cost compared to traditional methods for testing communications networks, which relied on devices called "probes." These probes were required to be physically located within the particular location of the communication network to be tested, which presented issues regarding the cost of maintenance and operation.

Figure 1:
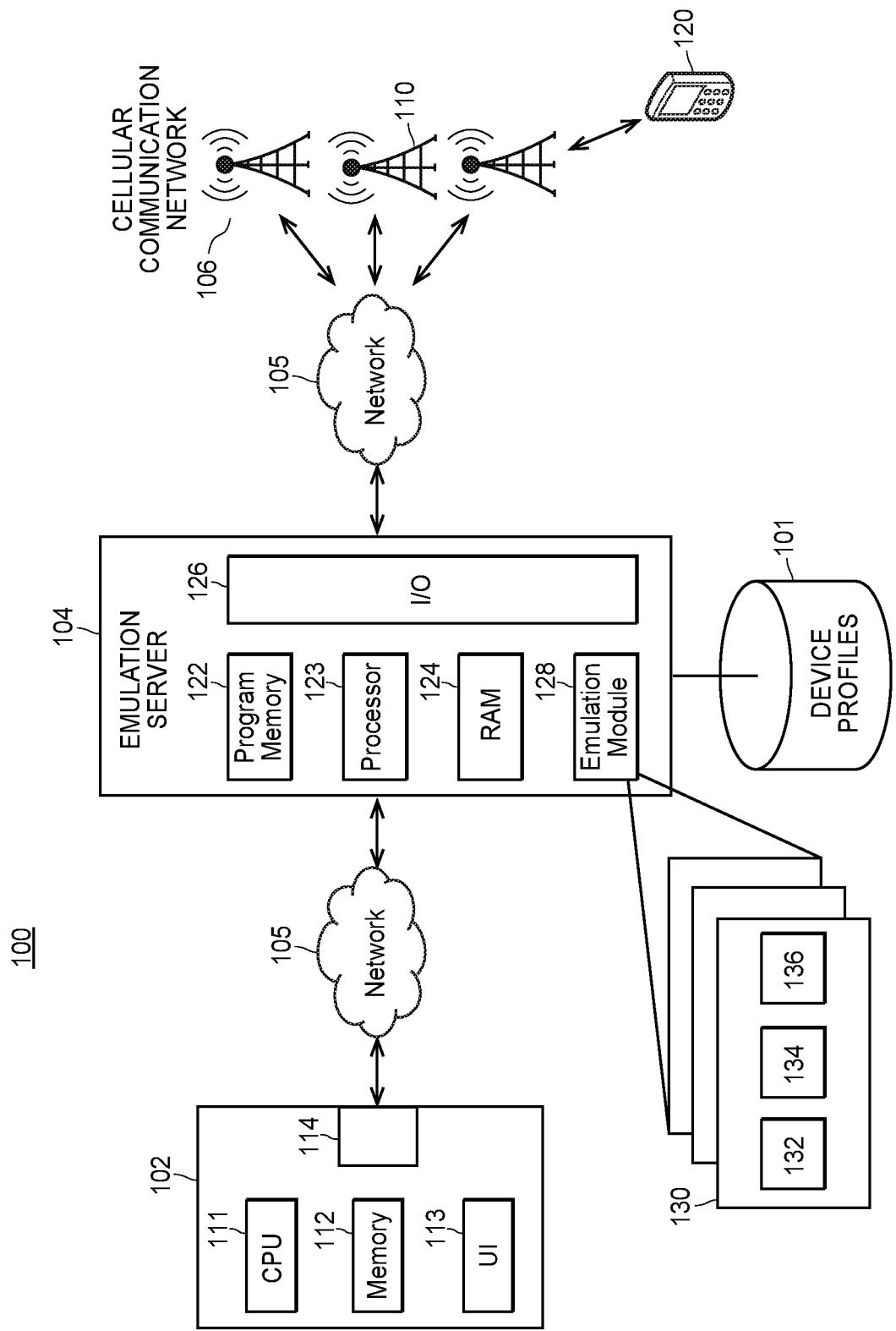
FIG. 1 illustrates an example system for testing the operability of a mobile device on a remote cellular communication network.

With reference to FIG. 1-5, several examples of the techniques of the present disclosure will now be described. As an initial matter, FIG. 1 illustrates an example computing system 100 for testing the operability of a mobile device at a remote location. As illustrated in FIG. 1, the system 100 includes a device profile database 101 connected to, or disposed within, an emulation server 104, which, in turn, is connected to one or more input devices 102 through a network 105. Additionally, the emulation server 104 may be connected to a cellular communication network 106 through network 105. The network 105 can include any suitable combination of a LAN, a MAN, a WAN, a mobile, a wired or wireless network, a private network, or a virtual private network. While only one input device 102 and one emulation server 104 are illustrated in FIG. 1 to simplify and clarify the description, it will be understood that any number of front end and server devices are supported and may be in communication with the system.

The input device 102 is a computing device that may include a CPU 111, one or more computer readable memory modules 112, one or more user interfaces 113 (keyboard, touch screen, etc.), a network interface 114, one or more peripheral interfaces, and other components. Further, other types of computers can be used that have different architectures. The input device 102 represents any suitable computing device, such as a PC, a smart phone, laptop computer, tablet personal computer, or "smart" device. More generally, the input device 102 represents any computing device or any other processing device having a user interface and CPU and capable of receiving inputs and displaying data.

The emulation server 104 receives, processes, produces, transmits, and stores data. The emulation server 104 includes a memory 122 storing processor-executable instructions in a non-transitory medium, one or more processors 123 configured to execute computer-readable instructions, a random-access memory (RAM) 124 for temporary memory, and an I/O circuit 218. The components of the emulation server 104 may be interconnected via an address/data bus or other means. It should be appreciated that although FIG. 1 depicts only one processor 123, the emulation server 104 may include multiple processors 123 in some embodiments. Similarly, the emulation sever may include multiple RAMs 124 and multiple memories 122. Although the communication system 100 depicts the I/O circuit 126 as a single block, the I/O circuit 126 may include a number of different I/O circuits, which may be configured for specific I/O operations. The processor 123 may include one or more processors of any known or hereafter developed type, including general-purpose processors or special-purpose processors. Similarly, the emulation server 104 may implement the RAM 124 and memory 122 as semiconductor memories, magnetically readable memories, optically readable memories, or any other type of memory.

The emulation server 104 and the input device 102 are also adapted to execute computer program modules for providing functionality described herein. As used herein, the terms "module" and "routine" refer to computer program logic used to provide the specified functionality. Thus, a module or a routine can be implemented in hardware, firmware, and/or software. In one embodiment, program modules and routines are stored on a storage device, loaded into memory, and executed by a processor or can be provided from computer program products that are stored in tangible computer-readable storage mediums (e.g. RAM, hard disk, optical/magnetic media, etc.).

An emulation module 128 may be implemented on the emulation server 104 or on the input device 102 (not shown). Typical cellular communication networks include mobile devices 120 connected to base stations 110, which base stations 110 are in turn connected to a packet core network. In the current disclosure, the emulation module 128 emulates the mobile device and base stations. The emulation module 128 then communicates with the packet core network to mimic actual operability of a mobile device on the cellular communication network.

The emulation module 128 may generate a clone image 130 including a clone mobile device 132 and one or more clone base stations 134 based on received/retrieved parameters. The emulation module 128 may then emulate the clone image 130 such that the clone mobile device 132 interacts with the clone base stations 134. The functionality of emulation module 128 is discussed in greater detail with respect to the figures below. In some embodiments, the clone image 130 may also include one or more clone serving gateways (SGWs) 136 in order to emulate packet routing to the core network. Further, the emulation module 128 may clone one or more additional components/services/nodes of the cellular communication network 106 in order to accurately test the operability of mobile devices at a remote location.

The network 105 may transmit and receive wired or wireless communications for devices in the system 100, using any suitable wireless communication protocol network, such as a wireless telephony network (e.g., GSM, CDMA, LTE, 5G, etc.), a Wi-Fi network (802.11 standards), a WiMAX network, etc. In addition, the components of the system 102, 104, and 106 may further be configured to communicate data through the network 105 using any suitable data protocol known or developed hereafter.

The device profiles database 101, which may be stored in or may be separate from the emulation server 104, contains configurations for a plurality of mobile devices. Each device configuration includes one or more parameters corresponding to the mobile device. The database 101 does not need to be physically located within emulation server 104. For example, the database 101 can be stored in external storage attached to the emulation server 104, or can be stored in a network attached storage. Additionally, there may be multiple emulation servers 104 that connect to a single database 101. Likewise, the database 101 may be stored in multiple different or separate physical data storage devices.

The cellular communication network 106 illustrated in FIG. 1 is simplified for clarity, as cellular communication networks can include various alternative arrangements of components at various locations and times. For example, only three base stations 110 are illustrated, while typical cellular communication networks have hundreds or thousands of base stations 110 establishing communication sessions. The cellular communication network 106 may include any additional network elements in support of remote services, some of which may be emulated in a manner similar to that described herein with respect to the base stations and mobile devices.

The cellular communication network 106 may be configured to transmit data according to various standards, including Long Term Evolution (LTE)/Evolved Universal Mobile Telecommunications System (UMTS) Terrestrial Radio Access Network (E-UTRAN) protocol or new radio (NR)/5G protocol. The above list is not intended to be limiting, and cellular communication network 106 may be configured using any known or hereafter developed communication protocol.

The cellular communication network may be a worldwide network providing internet and cellular network connections to millions of mobile devices 120. The cellular communication network 106 may comprise one or more servers, switches, cells, relays, satellites, gateways, transceivers, towers, or nodes and may include any combination of wired and wireless communication between these devices. In particular, the cellular communication network 106 includes millions of base stations 110 worldwide, and each base station 110 acts as the gateway (i.e., access point) between local mobile devices 120 and the larger cell network. As the gateway, the base stations 110 may be responsible for how each mobile device accesses the network. Thus, the base stations 110 control device access restrictions or limitations, such as the priority or speed of communication between the mobile device and the cell network. For example, a base station 110 may throttle the connection (i.e., limit the upload/download speed) between a mobile device and the cell network to ensure network stability. Further, the base station may identify a mobile device as "roaming" (i.e., out of the area covered by a corresponding mobile data plan) and otherwise limit the mobile device's connection to the cellular communication network and/or charge an account corresponding to the mobile device for roaming fees. Additional or alternative communication components may be included in the communication network in various embodiments.

Figure 2:
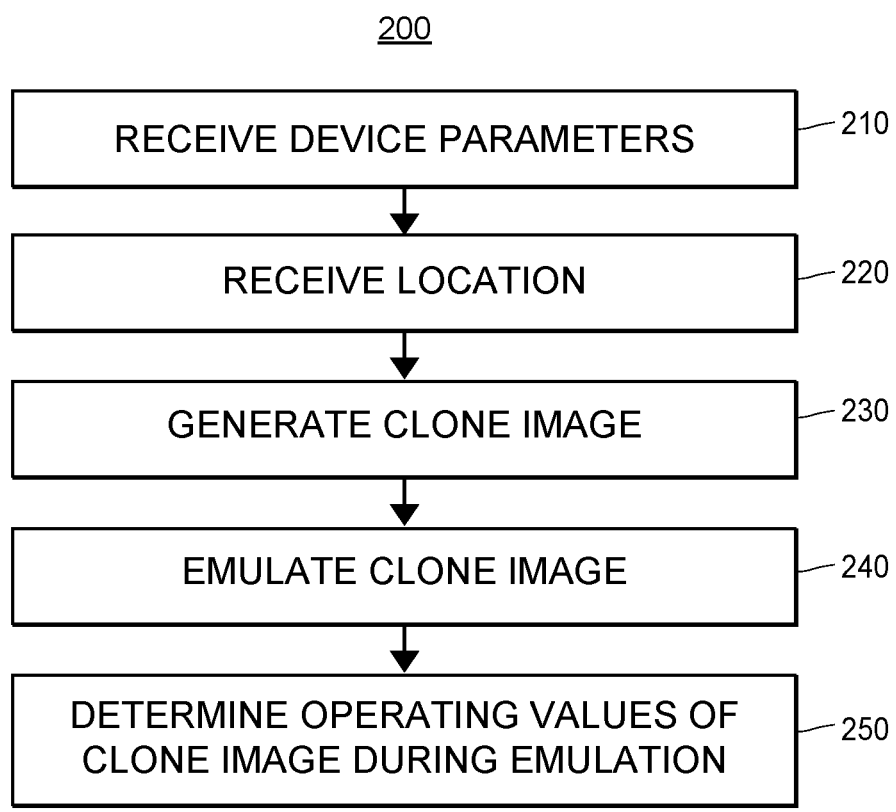
FIG. 2 illustrates an example method for testing the operability of a mobile device on a remote cellular communication network.

FIG. 2 illustrates a flow diagram of an exemplary method 200 for testing the operability of a mobile device at a remote location via emulation. The method may be implemented, as described above, by communicatively coupled components of the system 100 as illustrated in FIG. 1. However, in some embodiments, the method 200 may be performed in whole or part by the emulation server 104. In further embodiments, the method 200 may be performed in any suitable combination of components of the system 100.

The method may begin by receiving device parameters for a mobile device to be tested (block 210). The system may receive the device parameters through a user interface of an input device, such as input device 102 of FIG. 1. For example, the system may receive the parameters through an application programming interface ("API") call, where the API can initiate and/or facilitate communication between a server and a front-end device (such as devices 104 and 102 of FIG. 1, respectively). In some embodiments, the system may retrieve one or more device parameters from a database communicatively coupled to the system (such as database 101 of FIG. 1)

The device parameters include various details of the mobile device to be tested, as discussed in greater detail with respect to FIG. 3, below. In particular, device parameters may include any of a device make, a device model, a device serial number, a device ID, a calling plan, an International Mobile Equipment Identity (IMEI), a throttle condition, or a data plan. The above list is not intended to be limiting, and any relevant device parameter may be received as necessary to clone, emulate, and test the operability of a mobile device at a remote location.

In some embodiments, the device parameters will identify a specific device to determine the operability of the device in a remote location. In other embodiments, the system may receive a portion of the complete set of device parameters, the system may then perform the method to determine general operability of a device containing the received parameters on the remote network. For example, the system may only receive parameters indicating a make and model of the mobile device. The system may then perform the method to determine the operability of a mobile device with that make and model at a remote location including various combinations of other device parameters (e.g., with varying data plans, with varying throttle conditions).

The method may continue to receive a selection of a specific geographic location (block 220). The system may receive the specific geographic location through a user interface of an input device, such as input device 102 of FIG. 1. The selection of the location may be received as an indication of a specific base station in the cellular communication network. Alternatively, the location may be received as a longitude/longitude coordinate, a zip code, a city name, a state name, a country name, etc. In embodiments where the selected location is not a specific base station, the system may select a base station corresponding to the received location in order to test the operability of the device at the specific location. In another embodiment, the system may receive a Mobile Country Code (MCC) and/or a Mobile Network Code (MNC) as an indication for a specific geographic location. Using the MCC/MNC may allow the system to emulate multiple carriers for a particular geographic location by receiving an indication of both a location and a network.

In some embodiments, the method 200 may be implemented in batch mode, such that numerous device parameter configurations are received in a large data set and the method iterates through the data set and for each configuration. Further, a number of specific locations may also be received in batch mode, such that each item in the data set is tested at each received location. For example, the system may receive 100 unique device parameter configurations and ten specific locations to be tested in batch mode. The system may then test each of the 100 unique configurations at each of the ten locations in an iterative process to determine the operability of each device configuration at each location.

The system may receive the large data set through an input device. Alternatively, the system may retrieve the large data set for batch testing through one or more databases communicatively coupled to the system.

The method may then proceed to generate a clone image including the mobile device and one or more base stations (block 230). In some embodiments, an emulation module, such as emulation module 128 of FIG. 1, generates the clone image based on the retrieved and/or received device parameters and the received geographic location. As discussed above, the emulation module may be distributed among one or more devices in the system, and thus a server or other device in the system may generate the clone image in whole or in part. The clone image may include an operative duplicate of the mobile device corresponding to the device parameters. In an embodiment where the received device parameters are incomplete, the clone image may include a general copy of a device (e.g., the clone may generically represent a mobile device model, such as an iPhone® X).

The clone image is not intended to include an exact replica of a particular mobile device. For example, the clone image does not include data stored on local memory of the mobile device or include any physical features of the mobile device. Instead, the clone image includes a functional copy of the mobile device, where the clone image can be used to determine the operability of the mobile device at a remote location without the need of the original mobile device.

Similarly, the clone image may include one or more base stations corresponding to the received geographic location. The cloned base stations may include a number of features from the corresponding real-world base station. For example, a database may store one or more parameters for a plurality of base stations in the network. The system may then perform a database query and retrieve parameters for the one or more base stations to be cloned. Accordingly, the clone image may mimic the operability of the corresponding one or more base stations.

The system then emulates the clone image (block 240). In some embodiments, the emulation module of the emulation server may emulate the clone image while, in other embodiments, one or more client devices may emulate the clone image. The system may implement the clone image to mimic the mobile device as if communicating with the base station within the base station's geographical region. Emulation may include implementing the clone image to send data, download/receive data, send text messages, make phone calls, access the internet, or perform any other function applicable to a mobile device accessing the cellular communication network via the specific base station. In an embodiment, the system may have one or more predefined scripts of operations to perform while emulating the clone image.

The system may then evaluate the performance of the clone image to determine a set of operating values (block 250). The emulation server may determine a number of operating values relevant to the performance of a mobile device such as upload speeds, download speeds, signal strength, call quality, etc. Further, the emulation server may determine if, during emulation, the cloned device was recognized as roaming and/or if the communication between the cloned device and cloned base station was appropriately adjusted at a certain point (e.g., whether the communication was limited based upon network characteristics, account characteristics, user preference settings, etc.). Further, the system may compare the operating values of the clone image and compare the values to a set of predetermined values to determine a set of discrepancies. The system may then send the set of discrepancies to a front-end device for display (see FIG. 4, below).

Figure 3:
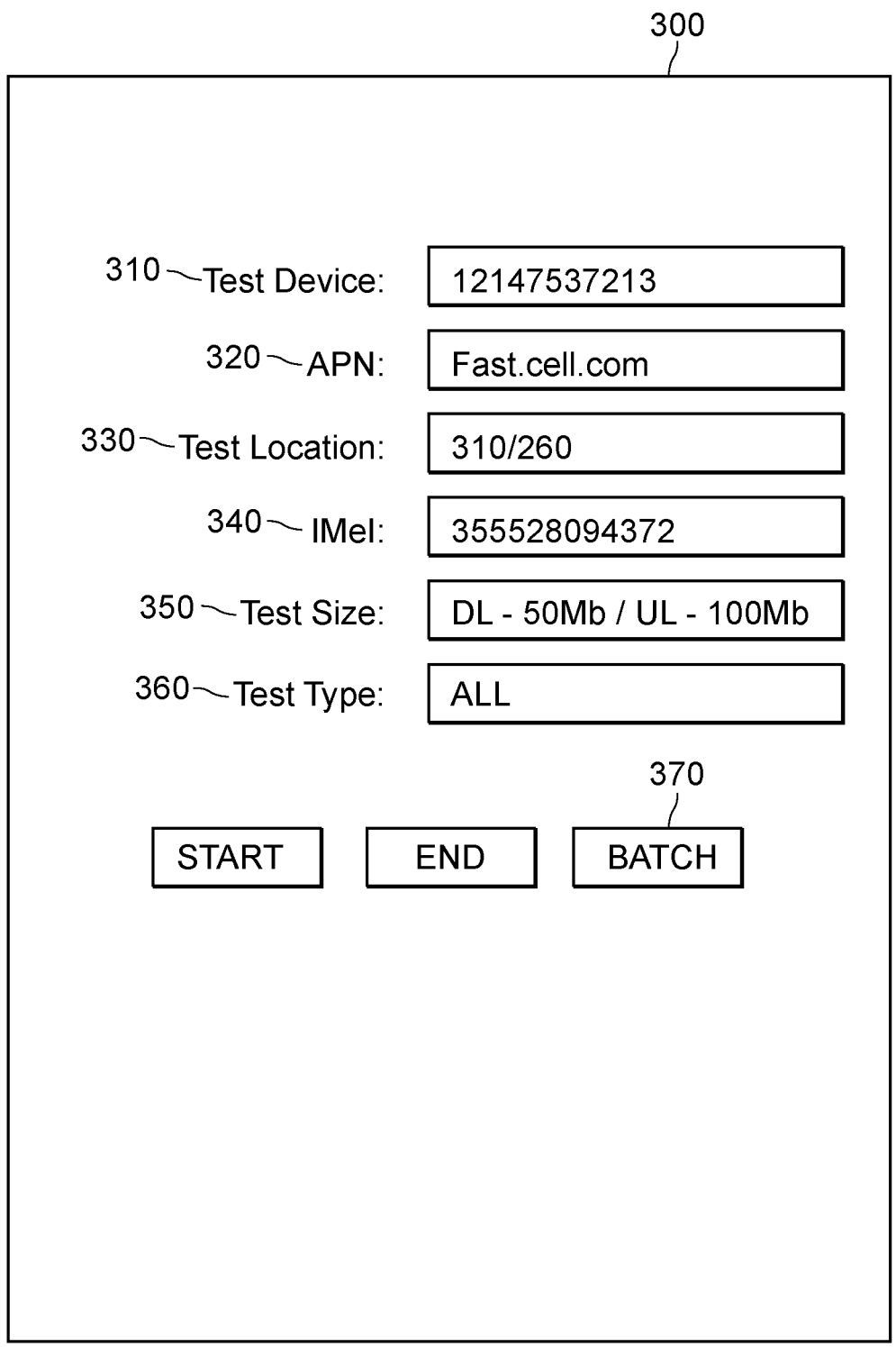
FIG. 3 illustrates an example user-interface for receiving one or more parameters corresponding to a mobile device for testing.

FIG. 3 illustrates an example user-interface 300 for receiving device parameters corresponding to a mobile device. The user-interface may include a text field to enter a test device ID 305. The test device ID 305 may indicate a specific Mobile Station International Subscriber Directory Number (MSISDN) (i.e., a phone number) and a cellular provider. In another embodiment, the test device ID 305 may be an account number, or some other indicator of the mobile data plan associated with the mobile device to be tested.

The interface 300 may also include a text box to receive an indication of an Access Point Name (APN) 320. The APN 320 is the name of a gateway between the mobile network and the device. An APN 320 indicates the network settings necessary for the enterprises User Equipment (UE) to connect to a secure gateway or to the internet. In another embodiment, the interface 300 may provide for input of a parameter called "network type," which indicates the type of network connection that is being tested, such as 3G, 4G, 5G, LTE, etc.

Further, the interface 300 may also provide a text box to receive an indication of a location 330. The location may be received in a number of suitable formats, such as a mobile country code (MCC) a mobile network code (MNC), a city name, a state name, a country, a global positioning system (GPS) coordinate, etc. The location 330 indicates the geographic location where the mobile device is to be tested. Based on the location 330, the system may determine one or more base stations to emulate as part of the clone image, as discussed above.

The interface 300 may also provide a text box to receive an indication of an IMEI 340. An IMEI 340 is a unique ID corresponding to a mobile device. The IMEI 340 helps identify the make/model of the mobile device being tested. In some embodiments, the interface 300 may provide additional text boxes to receive a cell phone make and cell phone model if the IMEI is not available.

The interface 300 may also include text boxes to receive indications related to the type of test to be performed. In particular, the interface may include a download/upload data 350 text field to receive an indication of the amount of data to upload and/or download during emulation. Further, the interface may include a text field to receive an indication of a test type 360. The test type 360 may indicate the type of test to be performed and what type of operating values to analyze during emulation. For example, the system may emulate a device to determine if the device access is appropriately adjusted or limited based on a data plan or user account settings. In another example, the system may emulate the device to determine if the device is recognized as roaming in a specific location.

In an embodiment, the interface 300 may also include an interactive icon to receive an indication to perform a batch 370 test. If the batch icon 370 is selected, the interface 300 may provide additional fields to receive an indication of where the data for a batch test can be located.

Example interface 300 is not intended to be limiting, and the interface may provide for the receipt of any number of parameters relevant to device testing/emulation.

Figure 4:
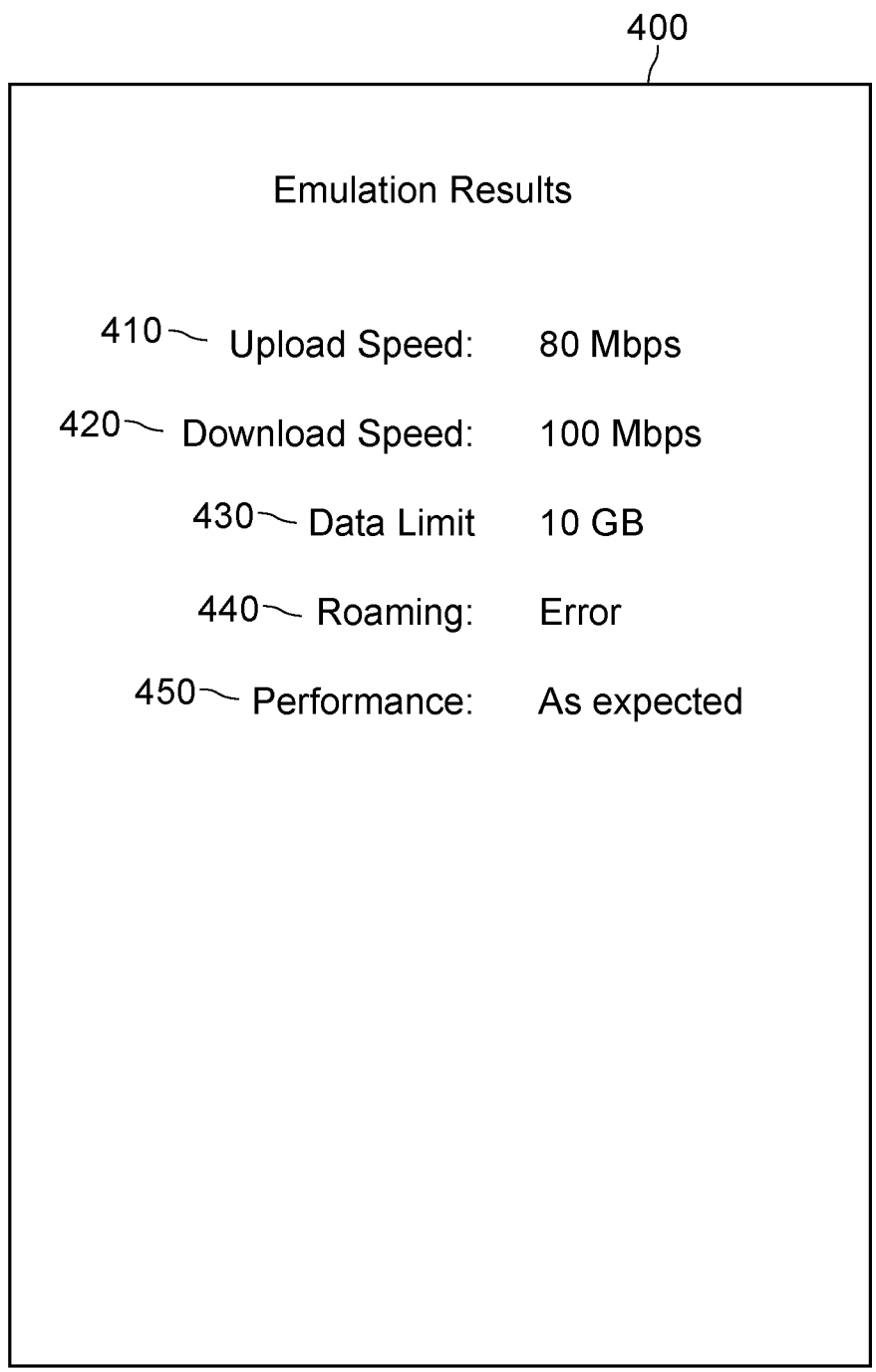
FIG. 4 illustrates an example user-interface for displaying the results of device emulation at a remote location.

FIG. 4 illustrates an example user-interface 400 displaying results of device emulation at a remote location. As describe above, the system may determine a number of operating values of the clone image during emulation. The operating values are indicative of the performance of the clone image and include various data such as upload speeds, download speeds, signal strength, call quality, etc. In some embodiments, the system may also compare the operating values to a set of predetermined expected performance values to determine if there are any discrepancies between the two sets.

Interface 400 includes a number of fields and displays both a mix of operating values (410-430) and a set of discrepancies (440-450). For example, the interface 400 provides operating values for upload speeds 410, download speeds 420, and data limit 430. Further, the interface 400 includes a set of discrepancies for roaming 440 and performance 450.

Interface 400 is intended as an example and is not intended to be limiting. Further, additional data can be provided upon completion of emulation. Still further, the information in interface 400 can be displayed such that an indication of an operating value can be displayed simultaneously with a set of discrepancies. For example, a download speed can be displayed as 100 Mbps in green text, where the green text indicates that the operating value matches the expected performance value. In another example, the download speed may be displayed in red text, indicating that the download speed is incongruent with the expected performance value.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

The embodiments described above may be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly, impliedly, or inherently set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Further, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be any of X, Y, or Z, or any combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed:

1. A system for testing and verifying mobile device operability on a remote cellular communication network via emulation, the system comprising:
an input device communicatively coupled to a network, the input device including a user-interface to receive inputs, wherein the network is communicatively coupled to a cellular communication network including a cellular communication infrastructure comprising a plurality of base stations, each base station corresponding to a geographic location;
an emulation server communicatively coupled to the network;
one or more non-transitory storage media configured to store processor-executable instructions; and
one or more processors operatively connected to the emulation server and the one or more non-transitory storage media and configured to execute the processor-executable instructions to cause the system to:
receive, via the input device, one or more parameters corresponding to a mobile device;
receive, via the input device, a selection of a specific geographic location;
determine, via one or more processors of the emulation server, a specific base station from the plurality of base stations on the cellular communication network, where the specific base station corresponds to the specific geographic location;
generate, via one or more processors of the emulation server, a clone image including a clone mobile device, a clone base station, and a clone serving gateway, where the clone mobile device is based on the mobile device corresponding to the one or more parameters, and where the clone base station corresponds to the specific base station and is configured to communicate with the cellular communication network as the specific base station via the clone serving gateway;
emulate, via the emulation server, the clone image such that the clone mobile device interacts with the clone base station to communicate with the cellular communication network through the clone base station and the clone serving gateway; and
determine one or more operating values indicative of a performance of communication between the clone mobile device and the clone base station of the clone image during the emulation of the clone image.

2. The system of claim 1, wherein the instructions further cause the system to:
compare the one or more operating values corresponding to the clone image to one or more expected performance values to determine a set of discrepancies.

3. The system of claim 2, wherein the instructions further cause the system to:
display, via a display of the input device, the set of discrepancies.

4. The system of claim 1, wherein the one or more parameters comprise one or more of a device make, a device model, a calling plan, or a data plan.

5. The system of claim 1, wherein the instructions causing the system to emulate the clone image further cause the system to:
cause the clone mobile device to download data from the clone base station.

6. The system of claim 1, wherein the instructions causing the system to emulate the clone image further cause the system to:
cause the clone mobile device to upload data to the clone base station.

7. The system of claim 1, wherein the instructions further cause the system to operate in a batch mode, wherein operating in batch mode includes:
receiving a set of device configurations, and
for each device configuration of the set of device configurations:
generating a new clone image including a new clone mobile device corresponding to the device configuration, where each new clone image also includes the clone base station;
emulating, via the emulation server, the new clone image such that the new clone mobile device interacts with the clone base station; and
determining one or more new operating values indicative of a performance of the new clone image during emulation of the new clone image.

8. A computer-implemented method for testing mobile device operability on a remote cellular communication networks, the method comprising:
receiving, via an input device, one or more parameters corresponding to a mobile device;
receiving, via the input device, a selection of a specific geographic location;
determining, via one or more processors of an emulation server, a specific base station from the plurality of base stations on a cellular communication network, where the specific base station corresponds to the specific geographic location;
generating, via one or more processors of the emulation server, a clone image including a clone mobile device, a clone base station, and a clone serving gateway, where the clone mobile device is based on the mobile device corresponding to the one or more parameters, and where the clone base station corresponds to the specific base station and is configured to communicate with the cellular communication network as the specific base station via the clone serving gateway;
emulating, via the emulation server, the clone image such that the clone mobile device interacts with the clone base station to communicate with the cellular communication network through the clone base station and the clone serving gateway; and
determining, via the one or more processors of the emulation server, one or more operating values indicative of a performance of communication between the clone mobile device and the clone base station of the clone image during the emulation of the clone image.

9. The computer-implemented method of claim 8, further comprising:
comparing the one or more operating values corresponding to the clone image to one or more expected performance values to determine a set of discrepancies.

10. The computer-implemented method of claim 9, further comprising:
displaying, via the input device, the set of discrepancies.

11. The computer-implemented method of claim 8, wherein the one or more parameters comprise one or more of a device make, a device model, a calling plan, or a data plan.

12. The computer-implemented method of claim 8, where emulating the clone image further includes:

cause the clone mobile device to download data from the clone base station.

13. The computer-implemented method of claim 8, where emulating the clone image further includes:
cause the clone mobile device to upload data to the clone base station.

14. The computer-implemented method of claim 8, further comprising operating in a batch mode, wherein operating in batch mode includes:
receiving a set of device configurations, and
for each device configuration of the set of device configurations:
generating, via the emulation server, a new clone image including a new clone mobile device corresponding to the device configuration, where each new clone image also includes the clone base station;
emulating, via the emulation server, the new clone image such that the new clone mobile device interacts with the clone base station; and
determining, via the emulation server, one or more new operating values indicative of a performance of the new clone image during emulation of the new clone image.

15. A tangible, non-transitory computer-readable medium storing processor-executable instructions that, when executed by one or more processors of a system, cause the system to:
receive, via an input device communicatively coupled to a network, one or more parameters corresponding to a mobile device;
receive, via the input device, a selection of a specific geographic location;
determine, via one or more processors of the emulation server, a specific base station from the plurality of base stations on a cellular communication network, where the specific base station corresponds to the specific geographic location;
generate, via one or more processors of the emulation server, a clone image including a clone mobile device, a clone base station, and a clone serving gateway, where the clone mobile device is based on the mobile device corresponding to the one or more parameters, and where the clone base station corresponds to the specific base station and is configured to communicate with the cellular communication network as the specific base station via the clone serving gateway;
emulate, via the emulation server, the clone image such that the clone mobile device interacts with the clone base station to communicate with the cellular communication network through the clone base station and the clone serving gateway; and
determine one or more operating values indicative of a performance of communication between the clone mobile device and the clone base station of the clone image during the emulation of the clone image.

16. The tangible, non-transitory computer-readable medium of claim 15, wherein the processor-executable instructions, when executed, further cause the system to:
compare the one or more operating values corresponding to the clone image to one or more expected performance values to determine a set of discrepancies.

17. The tangible, non-transitory computer-readable medium of claim 16, wherein the processor-executable instructions, when executed, further cause the system to:
display, via a display of the input device, the set of discrepancies.

18. The tangible, non-transitory computer-readable medium of claim 15, wherein the one or more parameters comprise one or more of a device make, a device model, a calling plan, or a data plan.

19. The tangible, non-transitory computer-readable medium of claim 15, wherein the instructions causing the system to emulate the clone image further cause the system to:
cause the clone mobile device to download data from the clone base station.

20. The tangible, non-transitory computer-readable medium of claim 15, wherein the instructions causing the system to emulate the clone image further cause the system to:
cause the clone mobile device to upload data to the clone base station.

* * * * *